United States Patent [19]

Moore

[11] 3,852,155

[45] Dec. 3, 1974

[54] CRYOPRESERVATION OF EQUINE CELL CULTURES

[76] Inventor: Richard W. Moore, Box 3568, Bryan, Tex. 77801

[22] Filed: Sept. 2, 1971

[21] Appl. No.: 177,453

[52] U.S. Cl. .................................. 195/1.8, 424/89
[51] Int. Cl. ........................ C12b 3/00, C12b 9/00
[58] Field of Search ...................... 195/1.8; 424/89

[56] References Cited

OTHER PUBLICATIONS

Fed. Proc. 22(1), pt.1 80–108, January, February, 1963, "Preservation of Cells," p. 91–15% calf serum p. 107–10% serum.

Evans et al., Cancer Res., 16:77–94, (1956), "Studies of Nutrient Media for Tissue Cells in Vitro," f.n.7, Horse Serum.

Dougherty, Nature, 193:550–552, Feb. 10, 1962, "Use of DMSO for Preservation of Tissue Culture Cells by Freezing," (Bovine Fetal Serum or Calf Serum).

Ashwood-Smith, Nature, 190:1204–1205, June 24, 1961, "Preservation of Mouse Bone Marrow at −79°C with DMSO," (Rat Serum).

Porterfield et al., Nature, 193:548–550, Feb. 10, 1962, Preservation of Cells in Tissue Culture by Glycerol ARD DMSO, (Calf Serum).

Moore et al., March 1970, Am. J. Vet. Res. 31(3):463–468, "A Method for the Continuous Culture of Peripheral Horse Leukocytes," (Sheep Serum, Calf, Goat or Horse Serum, −20°C.).

Moore et al., September 1970, Am. J. Vet. Res. 31(9):1569–1575, "Growth of the Equine Infectious Anemia Virus in a Continuous-Passage Horse Leukocyte Culture," (Frozen −20°C Sheep Serum).

*Primary Examiner*—Shep K Rose

[57] ABSTRACT

Certain equine cell cultures, such as horse leukocyte cultures, equine kidney, or equine testicle are preserved at reduced temperatures in liquid nitrogen in a medium composed of a predominant amount of an animal serum, specifically sheep serum or fetal bovine serum together with dimethyl sulfoxide. A preferred medium contains 91 percent sheep serum and 9 percent dimethyl sulfoxide.

6 Claims, No Drawings

CRYOPRESERVATION OF EQUINE CELL CULTURES

RELATED APPLICATIONS

This application contains subject matter related to the subject matter of patent application Ser. No. 173,385 entitled "Medium and Method for Growth of Superiorly Antigenic Equine Infectious Anemia Virus and Production of Immunizing Vaccine Thereform," filed Aug. 20, 1971 in the name of Richard W. Moore.

The cryopreservative method and medium of the instant invention are singularly useful in preserving equine cell cultures utilized in the methods disclosed in the said related application.

BACKGROUND

This invention relates to a medium and a method for the cryopreservation of equine cell cultures. More particularly, the instant invention provides a medium and method for the cryopreservation of continuous passage horse leukocyte cultures and other equine cell cultures, which enables the extended storage of equine cell lines while maintaining excellent viability and preserving the ability of cells to multiply upon removal from storage.

Moore et al. have disclosed a method for the continuous culture of peripheral horse leukocytes ("A Method for the Continuous Culture of Peripheral Horse Leukocytes," Am.J.Vet. Res., 31, 463–468, March 1970), and the subject matter of the above related application is related to the use of these continuous passage cultures to grow a superiorly antigenic EIA virus suitable for manufacture of a vaccine for immunizing horses against EIA. This continuous passage method of Moore et al. enables multiple passes, up to 20 passes, of horse leukocyte cells to produce continuingly viable cultures capable of further cell multiplication. It is apparent that it would be highly advantageous to have a means to preserve cultures developed by that continuous passage method at low passage levels to provide a stock of cells from the same cell line for purposes of experimentation.

The continuous passage method of Moore et al utilizes sheep serum in amounts of about 40 percent together with a basal nutrient medium of the type used to culture human leukocytes to obtain a horse leukocyte culture which could be passed successfully. The use of sheep serum enabled development of a culture which could be passed successfully while other animal serum did not appear capable of initiating growth of a culture which could be continuously passaged.

Once a cell line which is free of infection and having certain characteristics has been found and developed by such passage, it is highly desirable to be able to preserve a stock of such cells for use in subsequent experimentation and testing. However, no such method has been reported for continuous passage horse leukocyte cultures.

Other equine cell cultures such as cultures of primary equine kidney and primary equine testicle have also been found difficult to preserve. These cultures, particularly equine kidney culture, are valuable in preparation of the equine infectious anemia vaccine disclosed in said related application. Accordingly, the development of a method for cryopreservation of such equine cell cultures would be advantageous.

A number of media have been developed for cryopreservation of various types of animal cell cultures. For example, glycerol has been reported as a protective agent for the preservation of spermatazoa and as an agent to protect mammalian red blood cells during freezing and thawing operations. Red blood cells have also been preserved using a variety of alcohols, sugars and amides, including sucrose.

Polyvinylpyrrolidone has been used to give effective cryoprotection to red blood cells and dimethyl sulfoxide has been similarly disclosed as a low temperature protective agent for red blood cells. Dimethyl sulfoxide has also been used to preserve mouse lymphocytes at low temperatures. Bouroncle et al have reported upon the comparison of the cryoprotection afforded normal and leukemic blood cells by both dimethyl sulfoxide (DMSO) and polyvinylpyrrolidone (PVP). (Bouroncle et al., "Comparative Study of the Effectiveness of Dimethyl Sulfoxide and Polyvinylpyrrolidone in the Preservation of Human Leukemic Blood Cells at $-80°$ C", Cryobiology, 6: 409–415, 1970.)

DESCRIPTION OF THE INVENTION

It is an object of this invention to provide an effective method for cryopreservation of equine cell cultures, and further to provide a cryoprotective medium for storage of equine cell cultures to enable extended periods of storage while preserving both viability of the cells and their ability to reproduce and multiply.

It has been found that certain equine cell cultures can be preserved at low temperatures by suspending the cell cultures in a cryopreservative composition comprising a cryoprotective agent portion of dimethyl sulfoxide and a nutrient portion comprising an animal serum, preferably sheep serum or fetal bovine serum, in an amount such that the serum comprises a predominant amount of the overall cryopreservative composition.

Highly preferred as the cryopreservative medium is a mixture of 91 percent sheep serum with 9% DMSO by volume. However, cryopreservative media comprising as little as 60 percent sheep serum, 9% DMSO with the remainder of the medium composed of a basal cell culture medium, succeed in preserving continuous passage horse leukocyte cultures and other equine cells, although viability of the cells and grow out after storage are significantly diminished.

Lamb serum can be substituted for sheep serum, and fetal bovine serum may also be used. These sera are employed in the same amounts as the sheep serum.

The cryopreservation of cells in accordance with this invention is accomplished at extremely low temperatures of liquid air, liquid nitrogen, or the like. As will be appreciated by those skilled in the art, cryopreservation is preferably undertaken by subjecting cells to a rapid freeze as well as a rapid thaw to avoid rupture of the cell walls. These techniques should be adhered to.

Examples — In order to develop a cryopreservative media for continuous passage horse leukocyte cells, experimentation was undertaken with a number of different cryopreservative media. The continuous passage horse leukocyte cultures were prepared according to procedures set forth in Moore ("A Method for the Continuous Culture of Peripheral Horse Leukocytes," J. Vet. Res., 31: 463–468, 1970). Cells are pronased from glass of a primary horse leukocyte culture and passaged in a medium comprising 40 percent sheep serum, 59.5 percent of a basal cell culture medium suitable for growth of human leukocytes such as medium 199, medium RPMI 1640 or the like.

Horse leukocyte cells in continuous passage which were selected for cryopreservation were those which produced a confluent monolayer within 5 days. When a healthy young monolayer was established, the cells were removed with pronase, centrifuged and the supernatant was discarded. The cells were then resuspended in the cryopreservative medium being tested at a concentration of 600,000 cells per milliliter of medium and were refrozen.

The cell suspension was then dispensed into a triple glass distilled water washed 1 or 2 milliliter ampules which were then immediately sealed with an oxygen gas flame and frozen. Freezing was accomplished by suspending the ampules in liquid nitrogen vapor for 3 hours after which they were quickly removed and immersed in liquid nitrogen. Another method of freezing was to immediately place the ampules in a liquid nitrogen protective sleeve which was maintained at −20° C. for an hour. The cells were then placed in a −60° C. freezer for 1 hour and finally placed directly into liquid nitrogen.

Thawing of the ampules was effected rapidly by placing the ampules in a 37° C. water bath with constant agitation. Before the ampules were broken, they were disinfected by immersion in 95 percent ethanol for five minutes.

Tests were undertaken with glycerol, glucose, sucrose dimethyl sulfoxide and polyvinylpyrrolidone (PVP). The glycerol and PVP were sterilized by autoclaving at 18 p.s.i. pressure and 121° C. for 15 minutes. Other cryoprotective agents were filtered through a 450 mμ millipore filter.

Because of the unique ability of sheep serum to initiate growth of continuous passage horse leukocyte cultures, the initial medium tested comprised 40 percent by volume sheep serum, the designated volume percentage of cryoprotective agent, 0.5 percent lactalbumin hydrolysate, with the remainder being a basal medium, i.e., medium 199 with Hank's salts. Small amounts of antibiotics (200 units/ml. penicillin and 100 μg of streptomycin) were also added to prevent infection. This medium was similar to the medium with which Moore et al, supra, first succeeded in establishing a continuous passage horse leukocyte culture. The medium was maintained at a pH of 7.2 to 7.4.

Viability of cells after freezing was checked by a standard Trypan blue test. Cells were also examined microscopically to determine ability of the cells to spindle out and multiply. The growth medium in which the cells were placed to determine grow out after storage was identical to the cryopreservative medium save that the cryoprotective agent was not present and hence the basal medium above constituted 59.5 percent by volume of the grow out medium.

It also should be noted that four strains of continuous passage leukocytes were used developed from different horses. These are designated as strains 1–4 in the results below. A horse aortic cell line cultured from cells scraped from the inside of a horse aorta after autopsy and reported by Moore et al ("Growth of Equine Infectious Anemia in a New Cell System," Proc. of 73rd Meeting of U.S. Anim. Health Assoc., 1969) was also tested and denominated strain 5. It was ultimately found that cryopreservation of this cell line could be accomplished readily with other media as well as that of the instant invention.

| Example | Cell Strain | Cryoprotective Agent | % of Cells Viable (Trypan blue) | Cell Grow Out |
|---|---|---|---|---|
| 1 | 1 & 2 | 20% glycerine | 12% | No grow out on cells stored 10, 20, 40, or 168 days |
| 2 | 2 | 15% glycerine | 0 | No grow out in cells stored 15, 20, or 137 days |
| 3 | 2 | 10% glycerine | 0 | No grow out in cells stored 15, 20, or 137 days |
| 4 | 1 | 20% glycerine | 0 | No grow out in cells stored 10 days |
| 5 | 1 | 5% glycerol | 0 | No grow out in cells stored 10 days |
| 6 | 5 | 20% glycerol | 5–10% | No grow out in cells stored 10 days |
| 7 | 1 & 2 | 10% glucose | 0 | No grow out in cells stored 10 days |
| 8 | 1 & 2 | 20% glucose | 0 | No grow out in cells stored 10 days |
| 9 | 1 & 2 | 25% glucose | 0 | No grow out in cells stored 10 days |
| 10 | 1 & 2 | 30% glucose | 0 | No grow out in cells stored 10 days |
| 11 | 1 & 2 | 10% sucrose | 0 | No grow out after cells stored 5 days |
| 12 | 1 & 2 | 20% sucrose | 0 | No grow out after cells stored 5 days |
| 13 | 1 & 2 | 30% sucrose | 0 | No grow out after cells stored 5 days |
| 14 | 1 & 2 | 50% sucrose | 0 | No grow out after cells stored 5 days |
| 15 | 1 & 2 | 5% DMSO | 0% | No grow out after cells stored 2 days |
| 16 | 1 & 2 | 7% DMSO | 1–2% | No grow out after cells stored 2 days |
| 17 | 1 & 2 | 9% DMSO | 10–15% | 5–10% of cells spindled out after 2 days storage but did not multiply |
| 18 | 1 & 2 | 11% DMSO | 2–3% | No grow out after cells stored 2 days |
| 19 | 1 & 2 | 13% DMSO | 0 | No grow out after cells stored 2 days |
| 20 | 1 & 2 | 15% DMSO | 0 | No grow out after cells stored 2 days |

These experiments indicated that dimethyl sulfoxide at a concentration level of 9 percent had some cryoprotective effect upon the cells. Accordingly, it was determined to conduct experimentation at a DMSO level of 9 percent and to vary the amount of sheep serum in the cryopreservative media to determine if an optimum existed for this constituent.

| Example | Cell Strain | Cryoprotective Agent | Cell Viability | Cell Grow Out |
|---|---|---|---|---|
| 21 | 1, 2 & 3 | 9% DMSO 20% sheep serum | 5% | No grow out after cells stored 4 days |
| 22 | 1, 2 & 3 | 9% DMSO 40% sheep serum | 10-15% | No grow out after cells stored 4 days |
| 23 | 1, 2 & 3 | 9% DMSO 60% sheep serum | 15% | After 4 days storage, same growth, but less than 5% of cells of tested strains multiplied |
| 24 | 1, 2 & 3 | 9% DMSO 80% sheep serum | 25% | After 4 days storage, same growth, but less than 5% of cells of tested strains multiplied |

The freezing procedure was then altered to determine its effect upon cell viability. In the above tests, the nitrogen vapor method outlined above was used. A freezing method was attempted wherein the cells were frozen at −20° C. for 2-to-3 hours, then at −50° C. for 8 to 12 hours and then placed in liquid nitrogen. As can be seen from the results below, the freezing method appeared to have little effect upon cell viability or grow out.

| Example | Cell Strain | Cryoprotective Agent | Cell Viability | Cell Grow Out |
|---|---|---|---|---|
| 25 | 2 | 7% DMSO 20% sheep serum | 0 | No grow out after cells stored 2 days |
| 26 | 2 | 7% DMSO 40% sheep serum | 1-2% | No grow out after cells stored 2 days |
| 27 | 2 | 7% DMSO 60% sheep serum | 5% | No grow out after cells stored 2 days |
| 28 | 2 | 7% DMSO 80% sheep serum | 5-10% | No grow out after cells stored 2 days |
| 29 | 2 | 9% DMSO 20% sheep serum | 5% | No grow out after cells stored 2 days |
| 30 | 2 | 9% DMSO 40% sheep serum | 5% | No grow out after cells stored 2 days |
| 31 | 2 | 9% DMSO 60% sheep serum | 10% | Some cell grow out noticed after 2 days storage |
| 32 | 2 | 9% DMSO 80% sheep serum | 20% | Some cell grow out noticed after 2 days storage |

Since the better results were being obtained using higher concentrations of sheep serum, tests were carried out at high serum levels. Much improved results were obtained when all the basal medium was replaced by sheep serum as can be seen below.

Repeated tests with these different strains indicated excellent viability and grow out characteristics were consistently demonstrated by cells preserved in a medium containing about 9% DMSO and 91 percent sheep serum. Fetal bovine serum at 91 percent concentration will give good results as well when mixed with 9% DMSO.

To test the ability of this cryopreservative medium, a primary equine kidney culture was prepared by aseptically removing the kidney of a horse, separating and mincing the corticle tissue and trypsinizing the cells. After the cells were treated with trypsin, centrifuged, and washed; they were suspended immediately in 91 percent by volume fetal bovine serum and 9 percent by volume DMSO. Cell viability after storage is good with about 50 percent of the cells demonstrating the ability to grow and multiply after storage. Equine testicle may be similarly preserved in the media of this invention using sheep serum or fetal bovine serum.

The cryopreservative medium of this invention accordingly preferably contains about 9 percent dimethyl

| Example | Cell Strain | Cryoprotective Agent | % of Cells Viable (Trypan blue) | Cell Grow Out |
|---|---|---|---|---|
| 33 | 4 | 9% DMSO 80% sheep serum | 25% | Same grow out after cells stored 2 days |
| 34 | 4 | 9% DMSO 91% sheep serum | 80-85% | Large percent of cells grow out; full cell sheet obtained after 5-7 days after 2 days storage |
| 35 | 2 | 9% DMSO 91% sheep serum | 80-85% | Good grow out as in Ex. 34. |
| 36 | 3 | 9% DMSO 91% sheep serum | >85% | Excellent grow out | sulfoxide as a cryoprotective agent and a nutrient medium comprising about 80 percent by volume based upon the overall volume of the cryopreservative medium of an animal serum such as sheep serum or fetal bovine serum. The protective abilities of the dimethyl sulfoxide appear to fall off considerably when present in amounts of less than about 8 or more than about 10 percent, and hence concentrations of dimethyl sulfoxide within this range should preferably be used. In addition, the effectiveness of the cryopreservative medium increases as the serum concentration is raised above 80 percent and reaches an optimum in media wherein the serum and dimethyl sulfoxide are essentially the only components, i.e., with the dimethyl sulfoxide present in the amount of about 8 to 10 percent and serum constituting the remainder of the medium. But it will be understood that other constituents may be added as in conventional media. For example, antibiotics may be desired to prevent infection of the cell cultures, and these may be added in the appropriate and recognized amounts. If the serum is present at a level lower than 90 percent, and the dimethyl sulfoxide is present in the 8 to 10 percent range, the remainder of the nutrient medium is composed of a basal cell culture medium or a balanced salt solution. Basal media such as medium 199, medium RPMI 1640, or the like, are satisfactory if any basal medium at all is to be employed.

It should be noted that the cryopreservative media of this invention appears satisfactory for cryopreservation of a variety of equine cell cultures, e.g., continuous passage horse leukocytes, primary equine kidney cultures, primary equine testicle cultures, and horse aortic cell cultures. With the latter aortic cell line, however, the composition of the cryopreservative is not so critical as it apparently is with the continuous passage leukocyte cultures. For example, a horse aortic cell line was prepared and stored as above for 2 days and for about 135 days in a medium of 10 percent dimethyl sulfoxide, 40 percent sheep serum, and the remainder medium RPMI 1640. Viability checks of both storage samples showed a viability of 40 percent and an adequate cell grow out wherein 20 percent of the cells stored grew and multiplied. Horse leukocytes and primary equine kidney do not appear to be as easily cryopreserved.

Extended storage of such equine cells in this medium of dimethyl sulfoxide and serum for as long as six months showed not appreciable difference in viability or grow out characteristics of the stored cells.

In the course of experimentation, it was also found that another medium was also successful in cryopreservation of continuous passage horse leukocyte cultures. A medium composed of 40 percent sheep serum, 7 percent by volume polyvinylpyrrolidone and the remainder basal medium as above resulted in continuous passage horse leukocyte cells having an 80 percent viability and excellent grow out characteristics demonstrating growth to a full cell sheet in 5 to 7 days. The polyvinylpyrrolidone was present in the medium as a 30 percent solution (30 gm. of PVP to 70 cc. of Hank's balanced salt solution) so that 100 milliliters of the cryopreservative medium contained about 40 ml. of sheep serum, 23.3 ml. of the PVP solution containing 7 gm. of PVP and the remainder basal nutrient medium.

This polyvinylpyrrolidone medium is less preferred, however, since all the PVP must be washed from the cells. Any PVP left on the cells inhibits growth severely. This washing procedure is both difficult and produces erratic results at times. Since a sheep serum medium is used to grow and passage leukocyte cells and can be used to grow equine kidney or equine testicle, the cells which are cryopreserved in the preferred cryopreservative of this invention can be merely added to this growth medium after cells are removed from storage. The dimethyl sulfoxide does not appear to adversely affect the subsequent cell growth characteristics.

The freezing method employed in accordance with this invention does not appear to be critical. Liquid nitrogen is merely recited as a convenient method of achieving low temperatures, and other cryogens could be used. The freezing technique wherein the cells are reduced stepwise in temperature to −20° C. and then to −60° C., for short periods before immersion in liquid nitrogen appears to produce cells which are slightly more robust. Variation in viability and rate of multiplication of continuous passage horse leukocytes appears more closely correlatable with the difficulty which was encountered in growing and propagating the particular strain before storage. For example, cell strain 4 was most difficult to manipulate in the continuous passage cultures and was also slowest to grow to a confluent monolayer after storage.

The ultimate temperature to which the cells are reduced is at least to the range of the temperature of liquid oxygen (less than −183° C.). Convenient cryogens are liquid nitrogen or liquid air which produce slightly lower tempertures. Although use of liquid gas cryogens provide the easiest means of achieving these low temperatures, other means of refrigerating the cells to these temperatures could be used to achieve reduced temperatures in the same range.

Certain variations and modifications of this invention, particularly in the techniques employed in the method of this invention will be obvious to those skilled in the art, and such variations may be indulged without departing from the spirit or scope of this invention.

What is claimed is:

1. A method for the cryopreservation of an equine cell culture selected from the group consisting of horse leukocyte cultures and equine primary kidney cultures which comprises:
   suspending said equine cell culture in a cryopreservative medium comprising 8 to 10 percent by volume dimethyl sulfoxide and a nutrient medium containing sheep serum of fetal bovine serum in an amount sufficient to provide more than 80 percent by volume of said composition; and
   subjecting the suspension to cryogenic temperatures to freeze said suspension.

2. The method of claim 1 wherein said dimethyl sulfoxide is present in an amount of 9 percent by volume of said composition.

3. The method of claim 1 wherein said nutrient medium consists essentially of sheep serum.

4. The method of claim 1 wherein said nutrient medium consists essentially of fetal bovine serum.

5. The method of claim 1 wherein said method includes the steps of
   stepwise reducing the temperature of said suspension to about −20° C. and to about −50° C. to −60° C., and thereafter immersing said suspension in a cryogen.

6. The method of claim 1 including the step of suspending said equine cultures in separate volumes of said medium of about one milliliter, said culture being suspended at a concentration of about 600,000 cells per milliliter.

* * * * *